J. E. BALL.
BABY RETAINER.
APPLICATION FILED MAY 25, 1920.
1,364,019.
Patented Dec. 28, 1920.
2 SHEETS—SHEET 1.
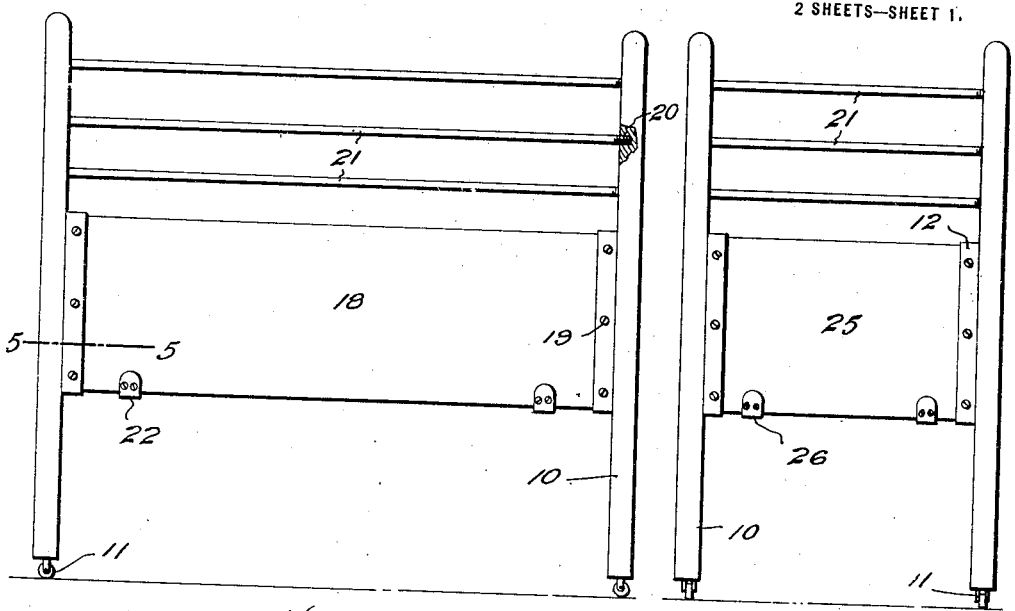
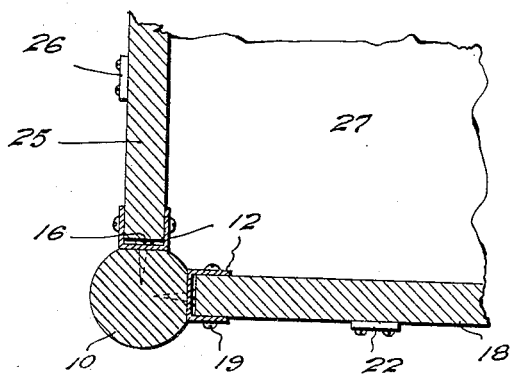
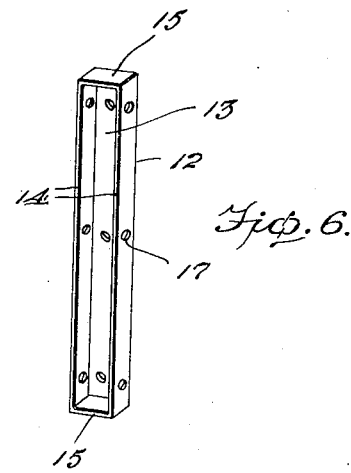
WITNESS:
P. M. Hunts
John E. Ball INVENTOR
BY Victor J. Evans
ATTORNEY J. E. BALL.
BABY RETAINER.
APPLICATION FILED MAY 25, 1920.
1,364,019. Patented Dec. 28, 1920.
2 SHEETS—SHEET 2.
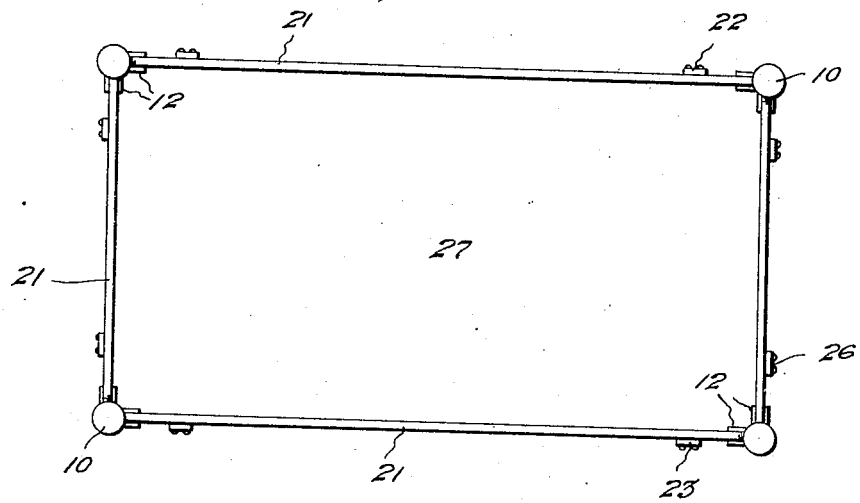
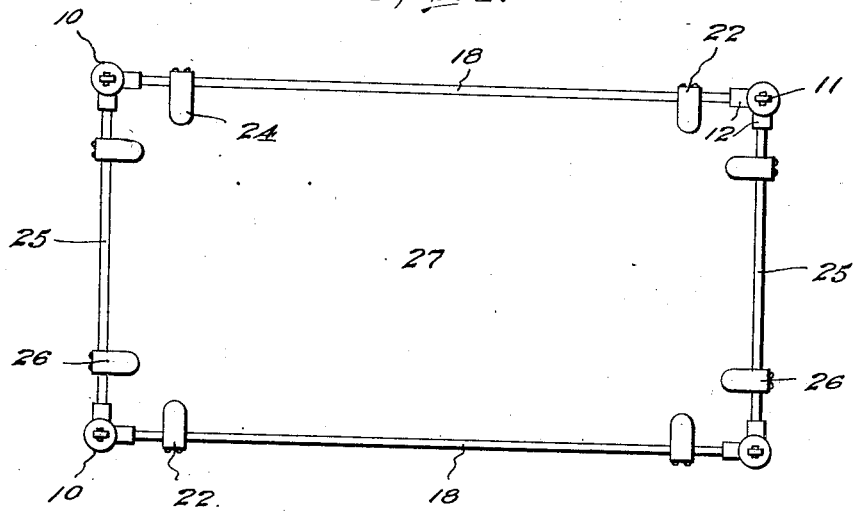
John E. Ball INVENTOR
BY Victor J. Evans ATTORNEY
WITNESS:

UNITED STATES PATENT OFFICE.

JOHN EDWARD BALL, OF COUNCIL BLUFFS, IOWA.

BABY-RETAINER.

1,364,019.  Specification of Letters Patent.  Patented Dec. 28, 1920.

Application filed May 25, 1920. Serial No. 384,069.

*To all whom it may concern:*

Be it known that I, JOHN E. BALL, a citizen of the United States, residing at Council Bluffs, in the county of Pottawattamie and State of Iowa, have invented new and useful Improvements in Baby-Retainers, of which the following is a specification.

This invention relates to furniture, particularly to devices for retaining babies or preventing them from having access to more than a certain prescribed area, and has for its object the provision of a device which is formed of a knock-down structure capable of being assembled to form an inclosure which might be considered as a so-called "baby coop," or which might be considered a crib, and which is designed for the purpose of preventing a baby from moving around beyond predetermined limits.

An important object is the provision of a device of this character which will be extremely simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of the device in assembled position,

Fig. 2 is an end view,

Fig. 3 is a top plan view,

Fig. 4 is a bottom plan view,

Fig. 5 is a detail horizontal sectional view on the line 5—5 of Fig. 1, and

Fig. 6 is a detail perspective view of one of the corner castings.

Referring more particularly to the drawings, the numeral 10 designates four upright posts which may be of any desired shape in cross section and of any desired height and these posts are preferably provided at their lower ends with casters 11.

Secured upon each post is a pair of castings 12 each of which is formed as an elongated member of trough-shape and including a back 13, sides 14, and ends 15. The members 12 are secured upon the posts 10 by means of screws 16 which pass through holes in the backs 13 and into the posts. It will be observed that the two castings carried by each post 10 are arranged ninety degrees apart. The sides 14 of these castings are provided with holes 17 for the purpose to be described.

Disposed between the posts 10 at each corner of the device, are side boards 18 which have their ends engaged within the members 12 and secured thereto by means of screws 19 or other suitable members passing through the holes 17. The posts 10 are furthermore provided above the castings 12 thereon with a plurality of sockets 20 which are internally threaded and extending between all of the posts are rods 21 which are externally threaded for engagement within the sockets 20. It will be observed that the threads at the ends of each rod 21 are opposite so that when a rod is placed in position and turned in one direction, it will be screwed into the sockets in the posts.

Secured upon the side boards 18 are members 22 which are L-shaped and which include ears 23 secured upon the outer faces of the boards 18 and which further include lugs 24 extending inwardly with respect to the side boards 18. The numeral 25 designates the end boards which are identical with the side boards 18 but which are disposed between the pairs of posts 10. The end boards 25 carry members 26 which are identical with the members 22. The bottom is designated by the numeral 27 and may be formed as a single board or plate or may be formed of a plurality of boards disposed in edge to edge relation, as preferred.

When the device is assembled by engaging the side boards 18 between two of the posts at each side, by placing the boards 25 between the pairs of posts and then screwing the rods 21 into the sockets 20, it will be seen that there is thus formed a rectangular inclosure of which the plate or plates or boards 27, as the case may be, constitute the bottom. There is thus formed a device which may be conveniently used as a crib by placing therein any suitable mattress or pad. The device may also be used simply as a baby retainer or so-called "kiddie coop," which will permit a baby to move around while preventing it from going beyond certain predetermined limits and getting into danger.

It will be readily apparent that if desired, the rods 21 may be unscrewed from the posts, the screws 19 removed, the boards 18 and 25 removed, and the entire device collapsed so as to occupy but little space in storage or transportation.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A device of the character described comprising four posts each provided at points ninety degrees apart with threaded sockets, rods disposed between the posts and having their end portions threaded for engagement within the sockets, a pair of castings carried by each post at ninety degrees apart, and side and end boards having their end portions engaged within and secured to said castings whereby to form a rectangular inclosure.

2. A device of the character described comprising four posts each provided at points ninety degrees apart with threaded sockets, rods disposed between the posts and having their end portions threaded for engagement within the sockets, a pair of castings carried by each post at ninety degrees apart, side and end boards having their end portions engaged within and secured to said castings whereby to form a rectangular inclosure, L-shaped members secured to said side and end boards and extending inwardly, and a rectangular bottom member engaged upon said L-shaped members.

In testimony whereof I affix my signature.

JOHN EDWARD BALL.